(12) United States Patent
Ohta et al.

(10) Patent No.: US 8,053,737 B2
(45) Date of Patent: Nov. 8, 2011

(54) RADIOGRAPHIC IMAGE DETECTION DEVICE AND RADIOGRAPHIC IMAGE DETECTION SYSTEM

(75) Inventors: Yasunori Ohta, Kanagawa (JP); Yutaka Yoshida, Kanagawa (JP); Naoyuki Nishino, Kanagawa (JP); Yoshiki Takeoka, Kanagawa (JP); Keiji Tsubota, Kanagawa (JP); Shoji Takahashi, Kanagawa (JP); Akihito Bettouyashiki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

(21) Appl. No.: 12/464,110

(22) Filed: May 12, 2009

(65) Prior Publication Data
US 2009/0283684 A1 Nov. 19, 2009

(30) Foreign Application Priority Data

May 15, 2008 (JP) ................................. 2008-128656

(51) Int. Cl.
*H01L 27/146* (2006.01)
*G01N 23/04* (2006.01)
(52) U.S. Cl. .................................. 250/370.09; 250/580
(58) Field of Classification Search ............. 250/370.09, 250/580, 581, 583, 584
See application file for complete search history.

(56) References Cited

U.S. PATENT DOCUMENTS

| | | | | |
|---|---|---|---|---|
| 6,296,386 B1 * | 10/2001 | Heidsieck et al. | ............ | 378/189 |
| 7,514,703 B2 * | 4/2009 | Iwakiri | ........................ | 250/584 |
| 7,575,374 B2 * | 8/2009 | Watanabe et al. | ............ | 378/189 |
| 7,847,277 B2 * | 12/2010 | Kito et al. | ...................... | 250/580 |
| 2006/0097177 A1 * | 5/2006 | Yamamoto | ............... | 250/370.08 |
| 2007/0272873 A1 * | 11/2007 | Jadrich et al. | ............ | 250/370.11 |

FOREIGN PATENT DOCUMENTS

JP 2002-159476 6/2002
JP 2002191586 A * 7/2002

* cited by examiner

*Primary Examiner* — David Porta
*Assistant Examiner* — Faye Boosalis
(74) *Attorney, Agent, or Firm* — SOLARIS Intellectual Property Group, PLLC

(57) ABSTRACT

Even when there are plural radiographic image detection devices and external devices between which communication takes place, a link with a designated external device may be established easily and reliably. An electronic cassette used in imaging or an electronic cassette that stores generated image data in an image memory is attached to a handle that stores a console ID, which indicates a console that is to be specified as a target of communication. When the attachment of the electronic cassette with the handle is detected by an attachment detection section, a connection request signal is sent to the console indicated by the console ID stored in the handle. When a connection permission signal is received from the console, a link between the electronic cassette and the console is established.

14 Claims, 8 Drawing Sheets

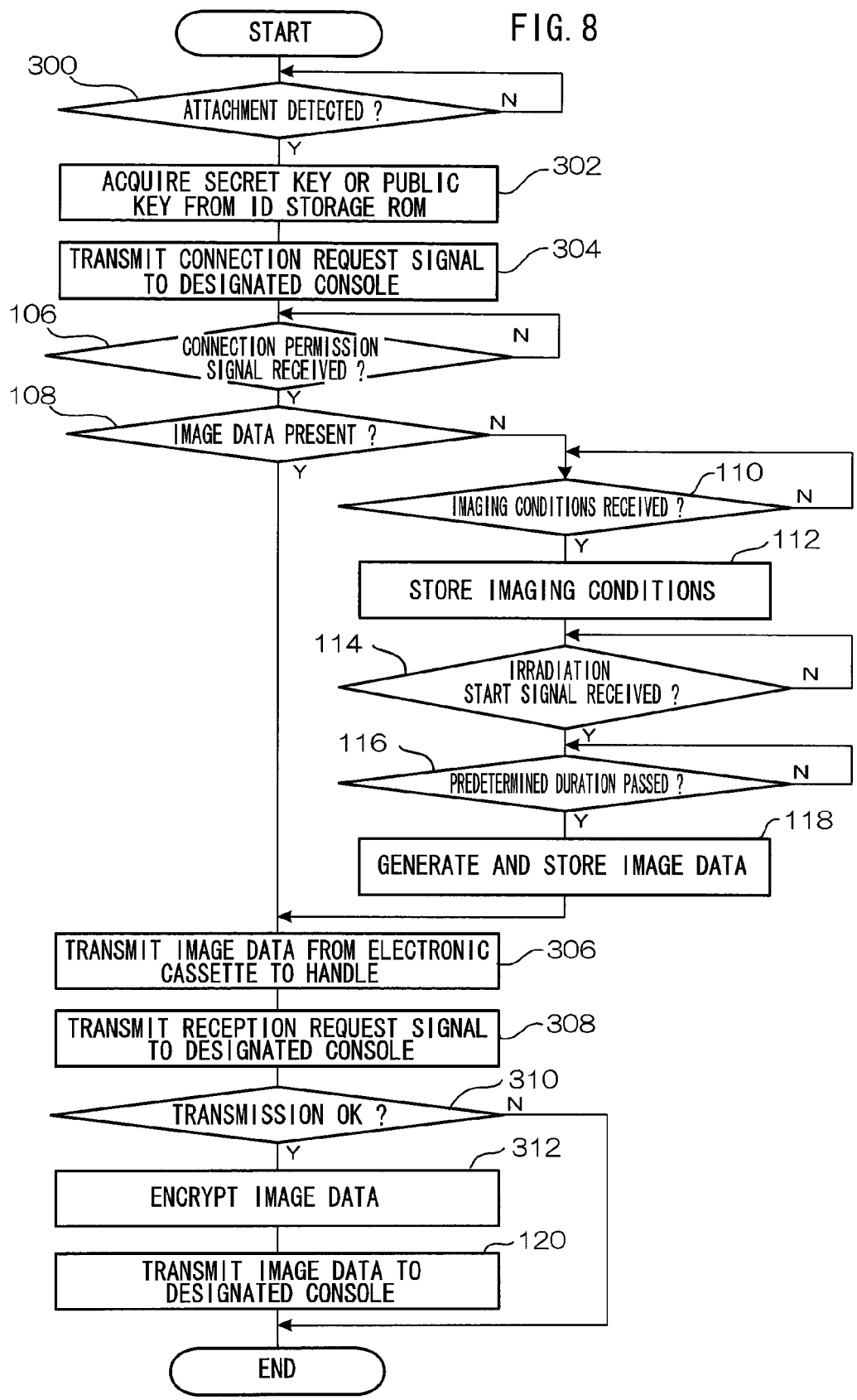

RADIOGRAPHIC IMAGE DETECTION DEVICE AND RADIOGRAPHIC IMAGE DETECTION SYSTEM

CROSS-REFERENCE TO RELATED APPLICATION

This application is based on and claims priority under 35 USC 119 from Japanese Patent Application No. 2008-128656 filed May 15, 2008, the disclosure of which is incorporated by reference herein.

BACKGROUND OF THE INVENTION

1. Field of the Invention

The present invention relates to a radiographic image detection device and a radiographic image detection system, and more particularly to a radiographic image detection device and radiographic image detection system that implement exchanges of data with a designated external device.

2. Description of the Related Art

In recent years, flat panel detectors (FPDs) have been realized in which an X-ray-sensitive layer is disposed on a thin film transistor (TFT) active matrix substrate and X-ray information can be directly converted to digital data. Using these FPDs and the like, portable radiographic image detection devices (below referred to as electronic cassettes) have been realized in which image data, which represents a radiographic image that is expressed by radiation passing through a subject which is a subject of detection or the like and being irradiated, is generated and the generated image data is stored.

In a radiographic image detection system that employs an electronic cassette, imaging is carried out in accordance with information, of imaging conditions and the like, that is inputted from a controller or the like, the image data generated by the electronic cassette is transmitted to the controller, and an image based on image data received by the controller is shown at a display or the like. Hence, checking of the captured image is carried out.

Because this electronic cassette is portable and easy to handle, plural electronic cassettes may be employed at the same time. Moreover, controllers may be plurally provided at a common location. In such a case, it is necessary to designate which electronic cassette is to transmit image data to which controller before the data is transmitted.

Accordingly, a radiographic image detection system has been proposed, in Japanese Patent Application Laid-Open (JP-A) No. 2002-159476, in which barcodes, which represent sheet ID numbers for identifying stimulable phosphor sheets installed in cassettes that are used for imaging, are read by controllers and stored in a server together with control IDs for identifying the controllers. When image data is read from a cassette and is to be transmitted, the sheet ID is read by an image-reading device, the controller ID associated with the sheet ID stored in the server is acquired, and the image data is transmitted to the controller indicated by the controller ID.

In the same radiographic image detection system of JP-A number 2002-159476, it is proposed that the controller ID is transmitted from the controller to the image-reading device to which is inserted a cassette holding image data that is to be transmitted, and when return of the image data is requested, the image data is transmitted to the designated controller.

However, in the radiographic image detection system of JP-A number 2002-159476, it is necessary to carry out registration of controller IDs for each cassette. This is particularly troublesome in cases in which an imaging room is distant from a location where the controllers are disposed, and the like. Moreover, a controller ID once registered in a cassette is retained and the same cassette is always used with that particular controller. Thus, flexibility of use of the cassettes is impeded.

Furthermore, when a cassette holding desired image data is identified by a controller, the cassette may be present in various locations of an imaging room or in another room, there may be cassettes that are of the same type and are difficult to tell apart at first glance, and so forth. In such cases, there may be an error in identification of the cassette. The result in such a situation is that it is not possible to transmit the image data to the designated controller.

SUMMARY OF THE INVENTION

The present invention is proposed to provide a radiographic image detection device and radiographic image detection system that, even in a case in which there are plural radiographic image detection devices and external devices that can be communicated with, are capable of simply and reliably establishing links with designated external devices.

An aspect of the present invention is a radiographic image detection device that includes an image data generator that generates image data representing an image based on amounts of radiation passing through an imaging subject and a controller that communicates with the external device indicated by the identification information when an attachable unit is detected as being attached to the image data generator, the attachable unit being attachable to the image data generator and including a storage unit that stores identification information identifying an external device.

BRIEF DESCRIPTION OF THE DRAWINGS

An exemplary embodiment of the present invention will be described in detail based on the following figures, wherein:

FIG. 8 is a flowchart illustrating a processing routine of communication relating to the second exemplary embodiment.

DETAILED DESCRIPTION OF THE INVENTION

Figure 1:
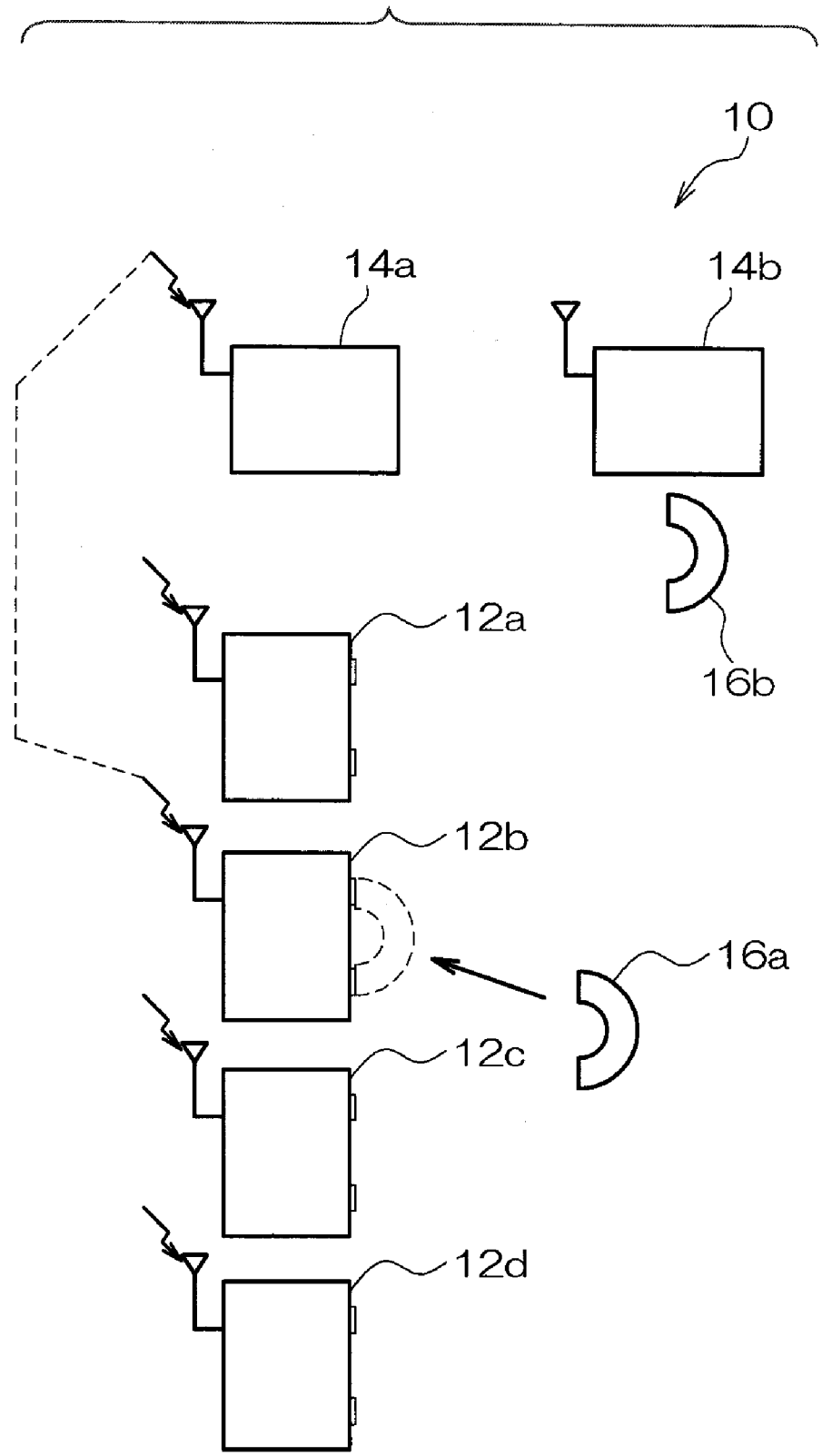
FIG. 1 is a schematic view illustrating structure of a radiographic image detection system relating to a first exemplary embodiment.

As shown in FIG. 1, a radiographic image detection system 10 relating to a first exemplary embodiment is constituted with portable radiographic image detection devices (hereinafter referred to as electronic cassettes) 12a to 12d, consoles 14a and 14b which serve as input/output devices, a handle 16a corresponding to the console 14a, and a handle 16b corresponding to the console 14b.

The electronic cassettes 12a to 12d all have the same structure. Therefore, the electronic cassette 12a will be described herein and descriptions will not be given for the electronic cassettes 12b to 12d.

Figure 2A:
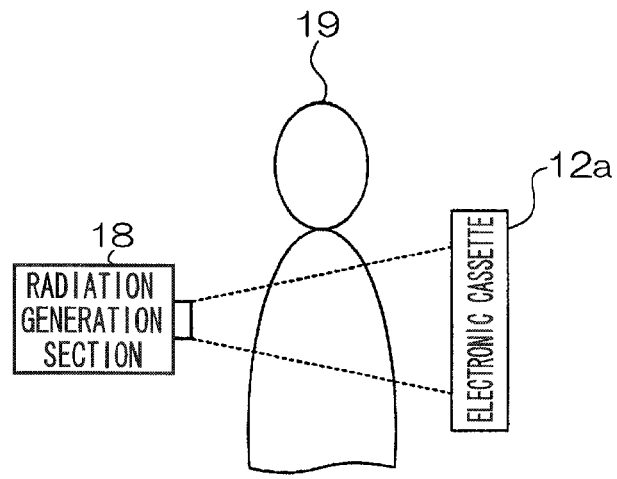
FIG. 2A is a schematic view illustrating disposition of an electronic cassette during radiographic imaging.

As shown in FIG. 2A, at a time of imaging of a radiographic image, the electronic cassette 12a is disposed to be spaced apart from a radiation generation section 18 that generates radiation such as X-rays or the like. An imaging position, for a subject of photographing 19 to be disposed in, is formed between the radiation generation section 18 and the electronic cassette 12a at this time. When imaging of a radiographic image is instructed, the radiation generation section 18 emits radiation in a radiation amount corresponding to imaging conditions provided in advance or the like. The radiation emitted from the radiation generation section 18 passes through the imaging subject 19 disposed at the imaging position and, carrying image information, is irradiated onto the electronic cassette 12a.

Figure 2B:
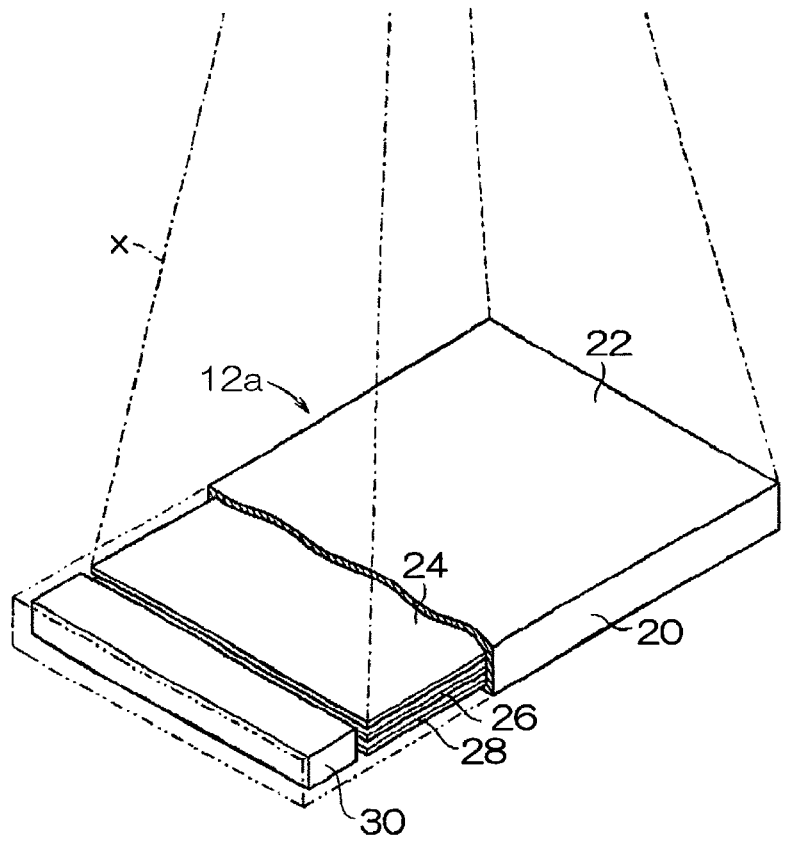
FIG. 2B is a perspective view illustrating internal structure of the electronic cassette.

As shown in FIG. 2B, the electronic cassette 12a is covered by a flat plate-form casing (casing body) 20 that has some thickness and is formed of a material that transmits radiation X. Inside the casing 20, a grid 24, a radiation detector (radiographic detection panel) 26 and a lead plate 28 are arranged in this order from the side of an irradiation surface 22 onto which the radiation X is irradiated. The grid 24 eliminates scattered rays of the radiation X that are generated as the radiation X passes through the imaging subject 19. The radiation detector 26 detects the radiation X. The lead plate 28 absorbs back-scattered rays of the radiation X. Herein, the irradiation surface 22 of the casing 20 may be constituted by the grid 24. A case 30 that accommodates various circuitry including a microcomputer (to be described later) is disposed at one end of the interior of the casing 20. In order to prevent the various circuits accommodated inside the case 30 being damaged by irradiation of the radiation X, it is desirable for lead plating or the like to be disposed at the irradiation surface 22 side of the case 30.

Figure 3:
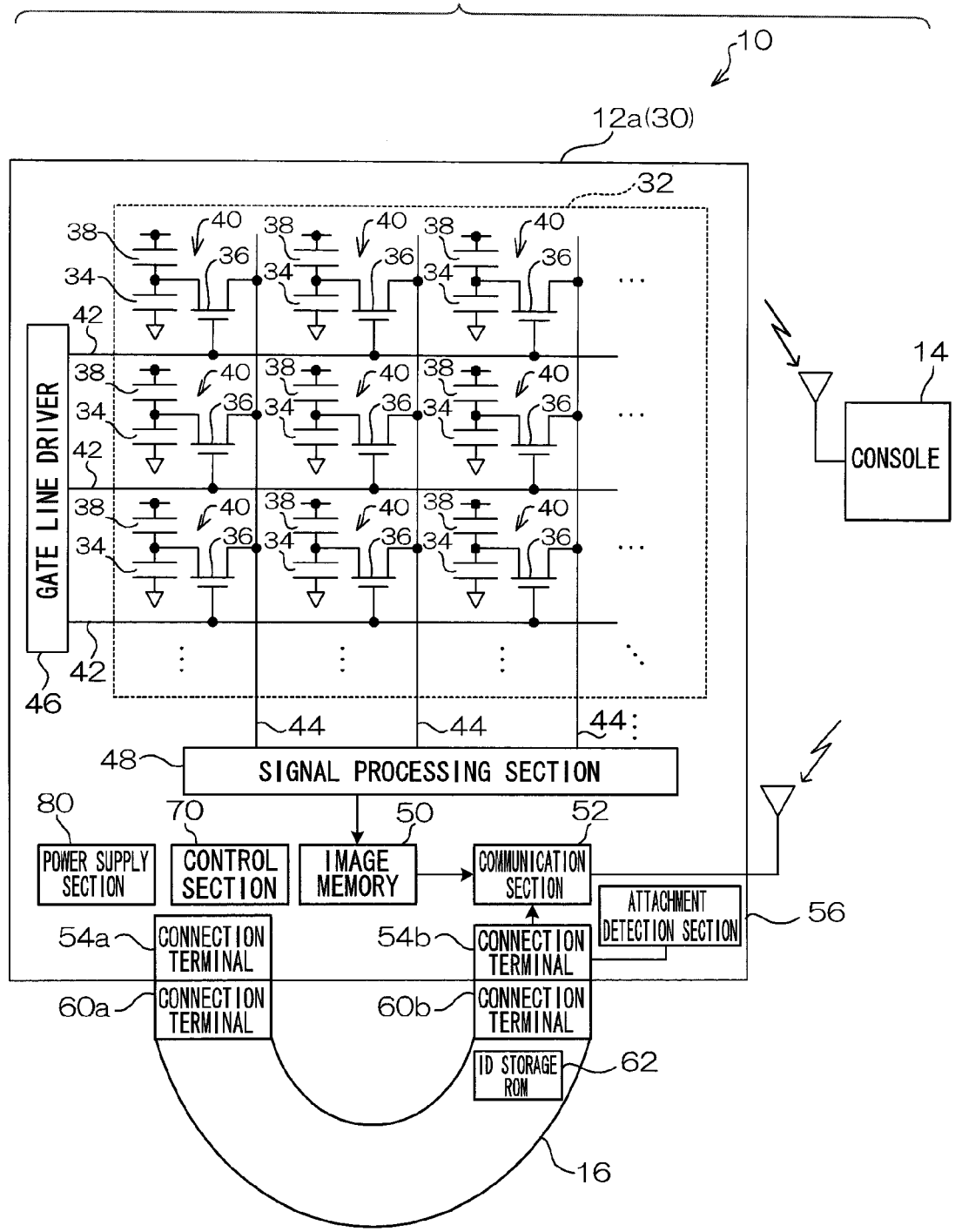
FIG. 3 is a block diagram illustrating schematic structure of the electronic cassette and a handle of the first exemplary embodiment.

The radiation detector 26 of the electronic cassette 12a is structured by a charge generation layer, which absorbs radiation and converts the same to electric charges, being layered onto a TFT active matrix substrate 32, which is illustrated in FIG. 3. The charge generation layer is formed of, for example, noncrystalline a-Se (amorphous selenium) of which selenium is a principal component (for example, a proportional content of at least 50%). When radiation is irradiated thereon, the charge generation layer generates electric charges (electron-hole pairs) thereinside with a charge amount corresponding to the irradiated radiation amount. Thus, the irradiated radiation is converted to electric charges. Cumulative capacitors 34, which accumulate the charges generated in the charge generation layer, and pixel portions 40, which are provided with TFTs 36 for read-out of the charges accumulated in the cumulative capacitors 34, are numerously provided in a matrix form on the TFT active matrix substrate 32 (the optoelectronic conversion layer corresponding with each of the pixel portions 40 is schematically shown as an optoelectronic conversion portion 38 in FIG. 3). The charges that are generated in the charge generation layer based on irradiation of radiation onto the electronic cassette 12a are accumulated in the individual cumulative capacitors 34 of the pixel portions 40. Thus, the image information carried by the radiation irradiated onto the electronic cassette 12a is converted to electric charge information and retained in the radiation detector 26.

Plural gate lines 42 and plural data lines 44 are provided in the TFT active matrix substrate 32. The gate lines 42 extend in a certain direction (a column direction) and are for turning the TFTs 36 of the pixel portions 40 on and off. The data lines 44 are provided in a direction crossing the gate lines 42 (a row direction) and are for reading out the accumulated charges from the cumulative capacitors 34 via the TFTs 36 that have been turned on. The respective gate lines 42 are attached to a gate line driver 46, and the respective data lines 44 are attached to a signal processing section 48. When charges are accumulated in the cumulative capacitors 34 of the respective pixel portions 40, the TFTs 36 of the pixel portions 40 are turned on sequentially, column by column, by signals provided through the gate lines 42 from the gate line driver 46. The charges accumulated in the cumulative capacitors 34 of the pixel portions 40 for which the TFTs 36 have been turned on are propagated through the data lines 44 as charge signals and inputted to the signal processing section 48. Thus, the charges accumulated in the cumulative capacitors 34 of the respective pixel portions 40 are sequentially read out in column units.

Although not illustrated in the drawings, the signal processing section 48 is provided with amplifiers and sample and hold circuits, which are provided for each of the data lines 44. The charge signals propagated through the respective data lines 44 are amplified by the amplifiers and then retained in the sample and hold circuits. A multiplexer and an A/D converter are provided, in this order, at the output sides of the sample and hold circuits. The charge signals retained by the respective sample and hold circuits are sequentially (serially) inputted into the multiplexers and converted to digital image data by the A/D converters. An image memory 50 is provided at the signal processing section 48, and the image data outputted from the A/D converters of the signal processing section 48 is sequentially stored in the image memory 50. The image memory 50 has a storage capacity capable of storing image data corresponding to plural frames. Each time imaging of a radiographic image is carried out, the image data obtained by the imaging is sequentially stored in the image memory 50.

The electronic cassette 12a is further provided with a communication section 52, connection terminals 54a and 54b, an attachment detection section 56, and a control section 70. The communication section 52 is for establishing exchanges of data by wireless communication between the electronic cassette 12a and one of the consoles 14. One of the handles 16 attaches to the connection terminals 54a and 54b. The attachment detection section 56 detects whether or not the handle 16 is attached to the electronic cassette 12a.

The control section 70 is constituted by a microcomputer that includes: a CPU which administers overall control of the electronic cassette 12a; a ROM which serves as a storage medium that stores a later-described program for data transmission/reception processing; a RAM which serves as a work area and temporarily stores data; and a memory which serves as a storage unit in which various kinds of information are stored.

A power supply section 80 is also provided in the electronic cassette 12a. The power supply section 80 supplies electrical power to various circuits and elements for operating the electronic cassette 12a. The power supply section 80 may incorporate a battery (a rechargeable secondary cell) so as not to impede portability of the electronic cassette 12a, and provide power to the various circuits and elements from the charged battery. Alternatively, the power supply section 80 may employ a primary cell as a battery, or may be continuously connected to a commercial power source, rectifying and transforming power provided from the commercial power source and providing this power to the various circuits and elements.

Next, the console 14 will be described. Because the consoles 14a and 14b have the same structure, the console 14a will be described herein and no description will be given for the console 14b.

The console 14a is constituted by a PC (personal computer) including a keyboard and mouse that serve as an input unit, a display that serves as a display unit, and a CPU, ROM, RAM and the like. The console 14a is further provided with a communication section for establishing exchanges of data by wireless communication between the console 14a and one of the electronic cassettes 12, and a connection terminal for attachment of one of the handles 16.

Figure 4A:
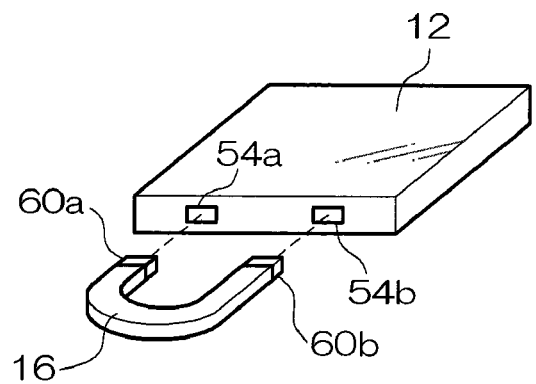
FIG. 4A is a perspective view illustrating the exterior of the electronic cassette and the handle.

As shown in FIG. 3 and FIG. 4A, the handles 16a and 16b are each provided with connection terminals 60a and 60b for attachment to the electronic cassette 12, and an ID storage ROM 62 that stores a console ID which identifies the corresponding console 14. To establish communication between the electronic cassettes 12 and the consoles 14, it is necessary to designate between which of the electronic cassettes 12 and which of the consoles 14 communication is to be carried out. This is because each electronic cassettes 12 do not contain information of a console ID of a target console with which the electronic cassette 12 communicates. Accordingly, a target console may be specified as the handle 16 that stores the console ID designating one of the consoles 14 is attached to the electronic cassette 12, enabling the electronic cassette 12 to acquire the console ID from the handle 16. As considered from the console 14, the electronic cassette 12 to which the handle 16 that stores the console ID of that console 14 is attached may be designated as the target electronic cassette 12 to which the console 14 communicates. Herein, the handle 16a stores a console ID designating the console 14a, and the handle 16b stores a console ID designating the console 14b.

Figure 4B:
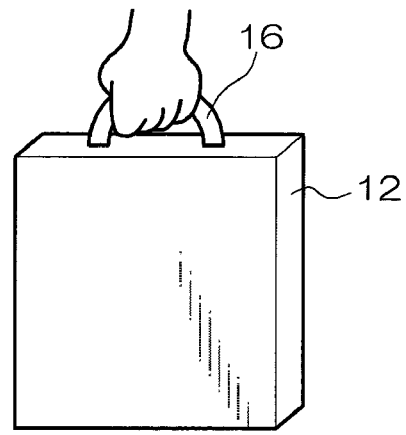
FIG. 4B is a perspective view illustrating the exterior of the electronic cassette and the handle in an attached state.
Figure 4C:
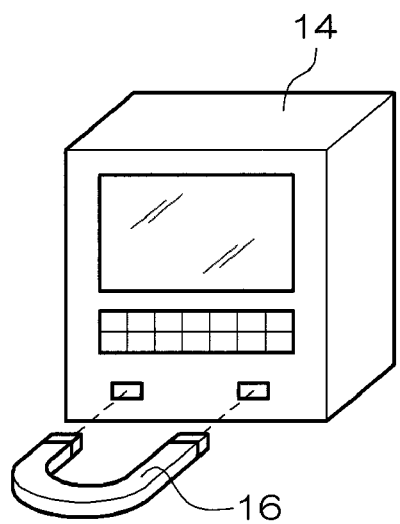
FIG. 4C is a perspective view illustrating the exterior of a console and the handle.

As shown in FIG. 4B, the handle 16 is formed in a letter U shape so as to function as a handle for carrying the electronic cassette 12 in the state in which the handle 16 is attached to the electronic cassette 12. The present exemplary embodiment has a letter U shape but it is sufficient that the shape functions as a handle. The shape may be a shape forming a cavity such as a letter T shape, a character Π shape, a circle or the like. As shown in FIG. 4C, the handle 16 may also be attached to the console 14.

Figure 5:
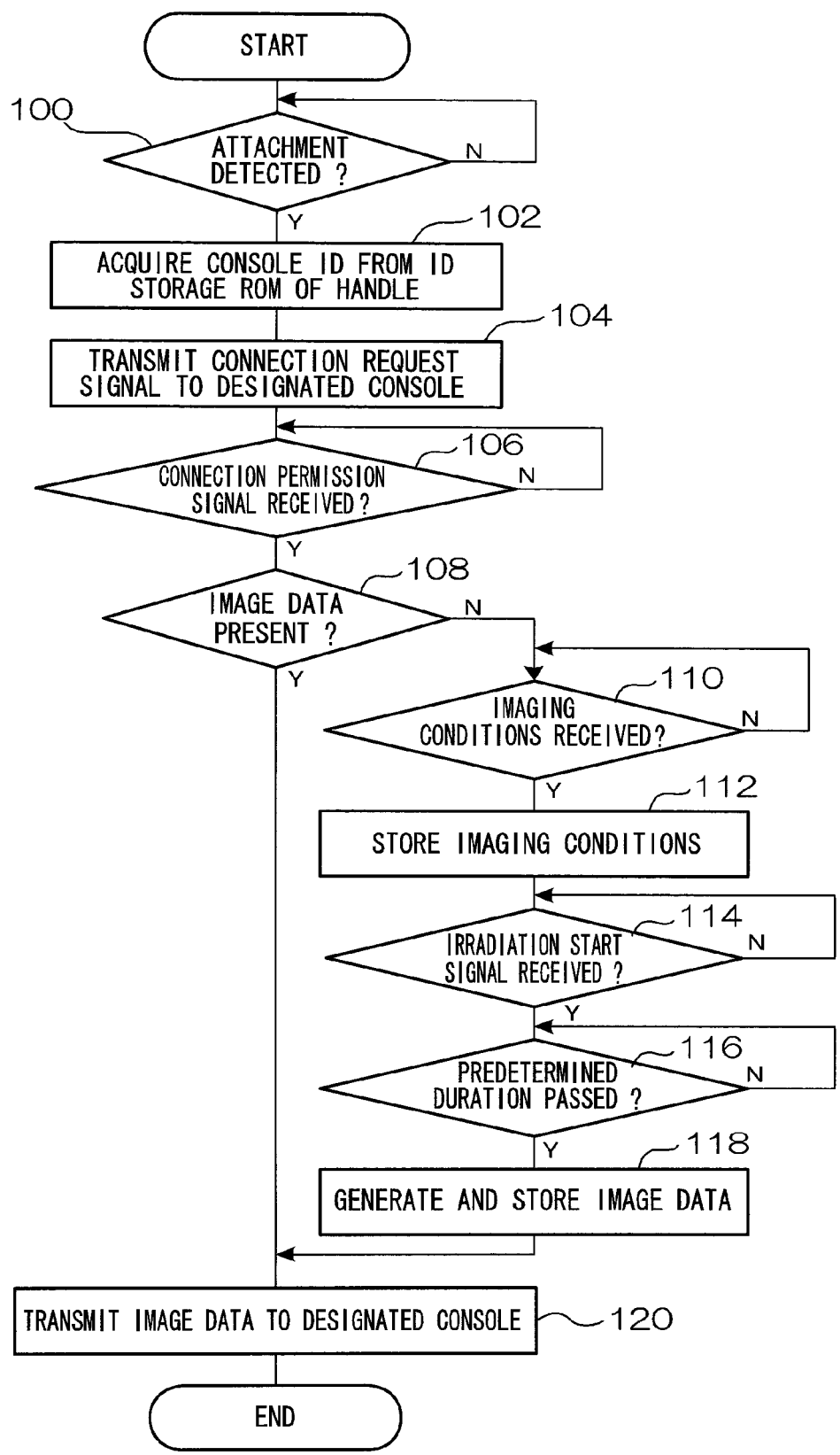
FIG. 5 is a flowchart illustrating a processing routine of communication relating to the first exemplary embodiment.

Next, a communication processing routine of the first exemplary embodiment will be described referring to FIG. 5.

In step 100, it is determined whether or not the handle 16 is attached. This determination is implemented by providing a signal line from the handle 16 to the electronic cassette 12 and detecting output of the signal line. If attachment is detected, the processing advances to step 102. If attachment is not detected, the processing waits until attachment is detected.

In step 102, the console ID stored in the ID storage ROM 62 of the handle 16 is acquired. For example, when specification of imaging conditions from the console 14a, an imaging instruction or the like are performed and imaging is to be carried out using the electronic cassette 12a, an operator attaches the handle 16a to the electronic cassette 12a. Hence, in the present step, the console ID indicating the console 14a that is stored in the handle 16a is acquired.

Then, in step 104, a connection request signal is transmitted to the console 14 indicated by the acquired console ID. In the example mentioned above, the connection request signal is sent to the console 14a. In step 106, it is determined whether or not a connection permission signal has been received from the console 14 that received the connection request. If the connection permission signal has been received, a link is established between the electronic cassette 12 and the console 14, and the processing advances to step 108. If the connection permission signal has not been received, the processing waits until it is received.

In step 108, it is determined whether or not image data is stored in the image memory 50. If some image data is stored, the processing advances to step 120, and if none is stored, it is determined that the electronic cassette 12 is in an imaging standby state and the processing advances to step 110.

In step 110, it is determined whether or not imaging condition data has been received from the console 14 with which the link has been established. If such data is received, the processing advances to step 112 and the received imaging condition data is stored. If none is received, the processing waits until such data is received. Here, the imaging conditions include information such as irradiation duration, an image data size and so forth.

Then, in step 114, it is determined whether or not irradiation of the radiation has started. For this determination, a switch for starting radiation irradiation is turned on from the console 14 or the like and a radiation irradiation start signal is transmitted to the radiation generation section 18, the radiation irradiation start signal is also transmitted to the electronic cassette 12 at this time, and it is determined whether or not the radiation irradiation start signal has been received. If the signal has been received, the processing advances to step 116, and if the signal has not been received, the processing waits until it is received.

In step 116, the imaging conditions that were stored in step 112 are referred to, and it is determined whether or not the predetermined radiation irradiation duration has passed. When the duration has passed, the processing advances to step 118, charges accumulated by the irradiation of radiation are read out, image data is generated, and the generated image data is stored in the image memory 50. If the predetermined duration has not passed, the processing waits until it has passed.

Then, in step 120, the image data is read from the image memory 50 and transmitted to the console with which the link has been established.

Thus, when a handle storing the console ID of a console that is to implement an imaging operation is attached to an electronic cassette, a connection request signal that designates the console indicated by the console ID stored in the handle is transmitted, and a link is established. Therefore, even if there are plural consoles, a link with a designated console may be established easily and reliably.

Next, a radiographic image detection system relating to a second exemplary embodiment will be described. Structures that are the same as in the first exemplary embodiment are assigned the same reference numerals and are not described. The second exemplary embodiment differs in that some of the structure with which the electronic cassette 12 is provided in the first exemplary embodiment is provided at the handle in the second exemplary embodiment.

Figure 6:
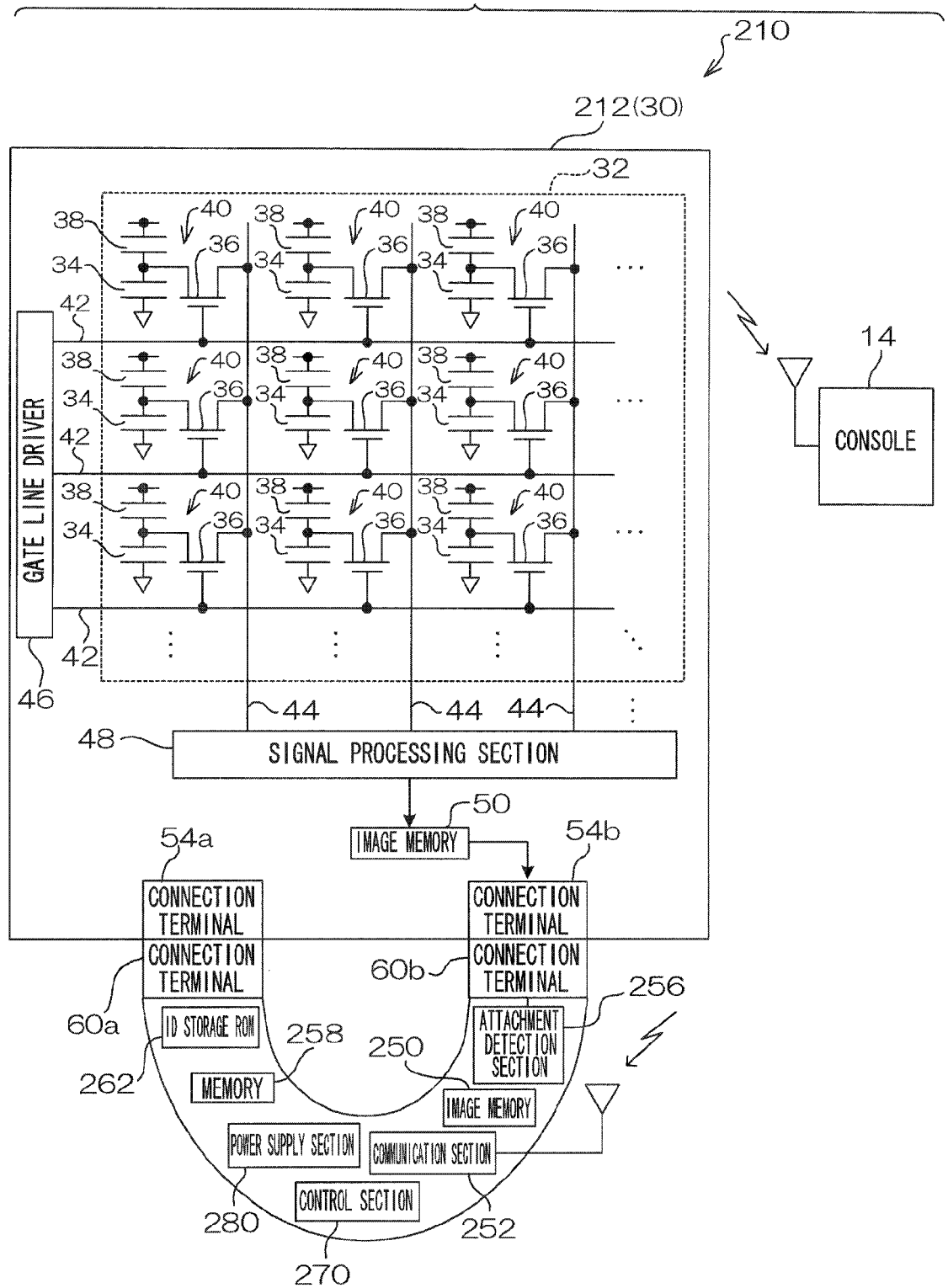
FIG. 6 is a block diagram illustrating schematic structure of an electronic cassette and handle relating to a second exemplary embodiment.

As shown in FIG. 6, a radiographic image detection system 210 relating to the second exemplary embodiment is structured with an electronic cassette 212, the console 14 and a handle 216.

The electronic cassette 212 includes the TFT active matrix substrate 32 at which the pixel portions 40 are formed in a matrix, the gate line driver 46, the signal processing section 48, the image memory 50, and the connection terminals 54a and 54b.

The handle 216 is structured with the connection terminals 60a and 60b, an ID storage ROM 262, an image memory 250, a communication section 252, an attachment detection section 256, a control section 270, a power supply section 280 and a memory 258. The image memory 250, control section 270 and power supply section 280 feature the respective same functions as, respectively, the image memory 50, control section 70 and power supply section 80 provided in the electronic cassette 12 of the first exemplary embodiment.

The ID storage ROM 262 stores, as an identification information, a secret key for encryption with shared key cryptography or a public key for encryption with public key cryptography, the secret key or public key being specified for each of the consoles 14.

The communication section 252 encrypts data with the secret key or public key stored in the ID storage ROM 262, and transmits the encrypted data to the console 14 indicated by the secret key or public key. In a case in which the encryption system is shared key cryptography, the console 14 receiving the encrypted data decrypts the data with the encrypting secret key and a shared secret key. In a case of public key cryptography, the console 14 decodes the data with the encoding public key and a matching secret key.

The memory 258 is for storing various kinds of information inputted by the console 14, such as imaging conditions, patient information, the electronic cassette ID and the like, which are acquired in the state in which the handle 216 is attached to the console 14 in the manner illustrated in FIG. 4C. At the time of imaging, the handle 216 is attached to the electronic cassette 212 and the information stored in the handle 216 is used in the imaging.

Because the memory 258 and the power supply section 280 are provided at the handle 216, the handle 216 is attached to the electronic cassette 212 and employed even during imaging. Therefore, in order to avoid the various circuits accommodated thereinside being damaged by radiation, lead plating or the like may be provided at an irradiated face of a casing of the handle 216.

Figure 7:
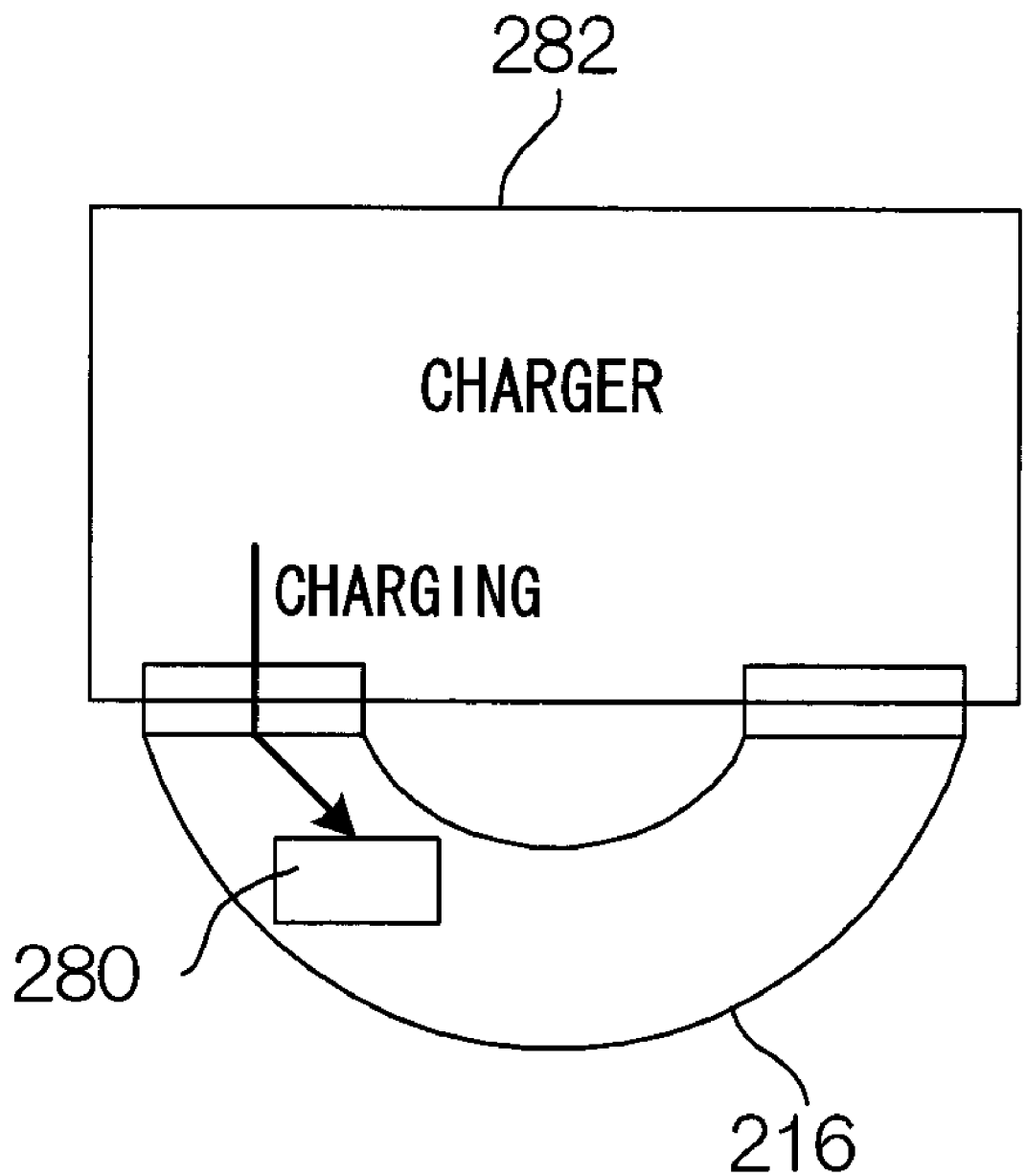
FIG. 7 is a schematic view illustrating a state in which the handle of the second exemplary embodiment is attached to a charger.

Because the handle 216 is constituted in this manner, an increase in compactness of the electronic cassette 212 may be achieved. Moreover, if a chargeable battery is employed at the power supply section 280, the handle 216 is attached to a charger 282 and charging is performed as shown in FIG. 7. Thus, handling at times of charging is simple and an increase in compactness of the power supply section 280 itself is possible.

Next, a communication processing routine of the second exemplary embodiment will be described referring to FIG. 8. The present routine starts when the power supply of the handle 216 is turned on, or the like.

In step 300, it is determined whether or not the electronic cassette 212 is attached. This determination is carried out by providing a signal line from the electronic cassette 212 to the handle 216 and detecting output of the signal line. If attachment is detected, the processing advances to step 302. If attachment is not detected, the processing waits until attachment is detected.

In step 302, the secret key or public key stored in the ID storage ROM 262 is acquired. Then, in step 304, a connection request signal is transmitted to the console 14 indicated by the secret key or public key.

Next, in step 106, it is determined whether or not there is a connection permission signal. If the connection permission signal has been received, a link is established between the electronic cassette 212 and the console 14, and the processing advances to step 108. If the connection permission signal has not been received, the processing waits until it is received.

In step 108, it is determined whether or not image data is stored in the image memory 50 of the electronic cassette 212. If some image data is stored, the processing advances to step 306, and if none is stored, the image data generation processing in steps 110 to 118 is carried out. If imaging conditions have been stored in the memory 258, the processing of step 110 and step 112 may be omitted.

Then, in step 306, the image data is read from the image memory 50 of the electronic cassette 212 and transferred to the image memory 250 of the handle 216. In step 308, an image data reception request signal is transmitted to the console 14 with which the link has been established. In step 310, it is determined whether or not an image data transmission permission signal has been received from the console 14 with which the link has been established. If this signal is received, the processing advances to step 312. If the signal is not received, the processing ends, because there may be a problem with, for example, communication conditions, the console 14 itself or the like. Hence, because the image data was stored in the image memory 250 at the handle 216 in step 306, the handle 216 may be detached from the electronic cassette 212 and attached to the console 14. Thus, because the image memory 250 is provided at the handle 216, the image data may be provided to the console 14 even when wireless communication is not possible.

Then, in step 312, the image data is read from the image memory 250 and encrypted with the secret key or public key. In step 120, the encrypted image data is transmitted to the console with which the link has been established.

Thus, in the second exemplary embodiment, because the communication section is provided at the handle, communication with a designated console may be carried out more reliably. Moreover, because encryption is used, reliability is further improved.

In the first exemplary embodiment, a case is described in which the handle 16 is attached in a state in which the power supply of the electronic cassette 12 is on, and in the second exemplary embodiment, a case is described in which the power supply of the handle 216 is turned on before the handle 216 is attached to the electronic cassette 212. However, in either case, the power supply may be turned on when the electronic cassette and the handle are attached, and the power supply turned off or a power-saving mode entered when the attachment is released. In such a case, the attachment of the electronic cassette and the handle may be detected by the power supply being turned on.

Furthermore, in the first exemplary embodiment, a case is described in which the control section, the power supply section, the communication section and the attachment detection section are all provided at the electronic cassette, and in the second exemplary embodiment, a case is described in which the control section, the power supply section, the communication section and the attachment detection section are all provided at the handle. However, each of the control section, the power supply section, the communication section and the attachment detection section may be provided at either of the electronic cassette or the handle. Furthermore, the control section and the power supply section may be provided at both the electronic cassette and the handle. Moreover, an image memory and a memory for storing information such as photographic conditions and the like may be provided in the handle of the first exemplary embodiment.

In the exemplary embodiments described above, cases have been described in which attachment of the electronic cassette and the handle is detected by providing a signal line.

However, the attachment may be detected by detecting with sensors that the opposing connection terminals have reached predetermined positions.

In the exemplary embodiments described above, cases have been described in which the generated image data is temporarily stored in the image memory before being transmitted. However, the image data outputted from the signal processing section may be transmitted immediately.

In the exemplary embodiments described above, cases have been described in which the image data is transmitted by wireless communication. However, the console may be connected with the electronic cassette or the handle through a signal line such as a USB cable or the like and the image data transmitted therethrough, or a portable memory may be attachable to the electronic cassette or the handle, with the image data being sent from the image memory of the electronic cassette or the handle to the portable memory, and then sent from the portable memory to the console.

In the exemplary embodiments described above, cases have been described in which a single handle corresponds with a single console. However, plural handles may correspond with a single console. In such a case, a common console ID or the like indicating the single console is stored in the respective ID storage ROMs of the plural handles.

According to the radiographic image detection device of the present invention, an image data generator generates image data representing an image based on amounts of radiation passing through a subject of imaging. When it is detected that an attachable unit, which is attachable to the image data generator and is equipped with a storage unit that stores identification information identifying an external device, is attached to the image data generator, a controller communicates with the external device indicated by the identification information. Here, communication with the external device includes reception of imaging conditions, transmission of image data, or reception of imaging conditions and transmission of image data.

Thus, when the image data generator and the attachable unit are attached, communication is established with the external device indicated by the identification information stored in the storage unit that is provided at the attachable unit. Therefore, even if there are plural external devices that are capable of communicating with the radiographic image detection device, a link with a designated external device may be established easily and reliably.

The radiographic image detection device of the present invention may further include a communication unit that performs communication with the external device, wherein the communication with the external device indicated by the identification information is performed by the communication unit.

Further, the radiographic image detection device of the present invention may further include a detector that detects whether or not the attachable unit is attached to the image data generator, the attachable unit being attachable to the image data generator and including the storage unit that stores the identification information identifying the external device, wherein, if it is detected by the detector that the attachable unit and the image data generator are attached, the controller communicates with the external device indicated by the identification information.

The radiographic image detection system of the present invention includes: a radiographic image detection device including an image data generator that generates image data representing an image based on amounts of radiation passing through a subject of imaging; an attachable unit that is attachable to the image data generator and includes a storage unit that stores identification information identifying an external device; a detector that is provided at one of the radiographic image detection device and the attachable unit and that detects whether or not the attachable unit is attached to the image data generator; and a controller that is provided at one of the radiographic image detection device and the attachable unit and that, if it is detected by the detector that the attachable unit and the image data generator are attached, communicates with the external device indicated by the identification information.

According to the radiographic image detection system of the present invention, the image data generator provided at the radiographic image detector generates image data representing an image based on amounts of radiation passing through a subject. The detector provided at the attachable unit, which is attachable to the radiographic image detection device or the image data generator and is equipped with the storage unit that stores the identification information identifying the external device, detects whether or not the attachable unit is attached to the image data generator. Then, when it is detected by the detector that the attachable unit and the image data generator are attached, the controller provided at the radiographic image detection device or the attachable unit communicates with the external device indicated by the identification information.

Thus, when the attachable unit is attached to the image data generator, communication is established with the external device indicated by the identification information stored in the storage unit that is provided at the attachable unit. Therefore, even if there are plural external devices that are capable of communication with the radiographic image detection device, a link with a designated external device may be established easily and reliably.

The radiographic image detection system of the present invention may further include a communication unit that is provided at one of the radiographic image detection device and the attachable unit and that performs communication with the external device, wherein the controller communicates with the external device indicated by the identification information through the communication unit.

A power supply for driving the radiographic image detection device may be provided at the radiographic image detection device or the attachable unit.

An image data storage region that stores the image data generated by the radiographic image detection device may be provided at the attachable unit. The image data storage region may be provided at the storage unit, and may be provided at a separate image data storage unit. Hence, because the image data storage region is provided at the attachable unit, the attachable unit may be employed as an image memory with portability.

The attachable unit may also be attachable to the external device, and a imaging condition storage area that stores information representing a imaging condition, which is inputted from the external device, may be provided at the attachable unit. The imaging condition storage region may be provided at the storage unit, and may be provided at a separate imaging condition storage unit. Hence, because the information representing an imaging condition may be stored at the attachable unit, the attachable unit storing this information may be attached to the radiographic image detection device and imaging conditions that are to be set in the radiographic image detection device may be set. Consequently, there is no need to connect the radiographic image detection device with the external device for imaging condition setting. Moreover, because the radiographic image detection device and the external device are attached by an operator, operation is more reliable than in a case in which the information is transmitted by wireless communication or the like, and this provides reassurance.

The radiographic image detection system of the present invention may be formed with one of the attachable unit corresponding to one of the external device. Hence, because a one-to-one configuration of the external device and the attachable unit is formed, image data will not be transmitted from plural radiographic image detection devices to the one detection device at the same time, and interference may be avoided.

The attachable unit may be formed so as to function as a handle for carrying the radiographic image detection device when attached to the image data generator. Thus, handling of the radiographic image detection device is facilitated.

The communication unit of the radiographic image detection device or radiographic image detection system of the present invention may be a wireless communication unit that communicates by wireless communication. Thus, there is no need to connect the radiographic image detection device with the external device by wire in order to perform communication, and the radiographic image detection device is more effectively portable.

The identification information may be a secret key for, when performing communication with the external device indicated by the identification information, encrypting data to be transmitted with shared key cryptography or may be a public key for encrypting the same with public key cryptography. Thus, in addition to being able to designate an external device with which communication is possible, security of data transmissions is improved.

According to the radiographic image detection device and radiographic image detection system of the present invention as described hereabove, an effect is provided in that, even when there are plural radiographic image detection devices and external devices with which communication is possible, links may be established with designated external devices easily and reliably.

What is claimed is:

1. A radiographic image detection device comprising:
an image data generator that generates image data representing an image based on an amount of radiation passing through an imaging subject; and
a controller that communicates with an external device indicated by identification information when an attachable unit is detected as being attached to the image data generator, the attachable unit being attachable to the image data generator and including a storage unit that stores the identification information identifying an external device.

2. The radiographic image detection device according to claim 1, further comprising a communication unit that communicates with the external device,
wherein the controller causes the communication unit to communicate with the external device indicated by the identification information.

3. The radiographic image detection device according to claim 2, wherein the communication unit communicates by wireless communication.

4. The radiographic image detection device according to claim 1, further comprising a detector that detects whether or not the attachable unit is attached to the image data generator,
wherein the controller communicates with the external device indicated by the identification information when the detector detects that the attachable unit is attached to the image data generator.

5. The radiographic image detection device according to claim 1, wherein, when communication is performed with the external device indicated by the identification information, the identification information includes a secret key for encrypting data to be transmitted with shared key cryptography or a public key for encrypting data to be transmitted with public key cryptography.

6. A radiographic image detection system comprising:
a radiographic image detection device including an image data generator that generates image data representing an image based on an amount of radiation passing through an imaging subject;
an attachable unit that is attachable to the image data generator and comprises a storage unit that stores identification information identifying an external device;
a detector that is provided at one of the radiographic image detection device or the attachable unit and that detects whether or not the attachable unit is attached to the image data generator; and
a controller that is provided at one of the radiographic image detection device or the attachable unit and that communicates with the external device indicated by the identification information when the detector detects that the attachable unit is attached to the image data generator.

7. The radiographic image detection system according to claim 6, further comprising a communication unit that is provided at one of the radiographic image detection device or the attachable unit and that communicates with the external device,
wherein the controller communicates with the external device indicated by the identification information via the communication unit.

8. The radiographic image detection system according to claim 7, wherein the communication unit is a wireless communication unit that communicates by wireless communication.

9. The radiographic image detection system according to claim 6, further comprising, at one of the radiographic image detection device or the attachable unit, a power supply for driving the radiographic image detection device.

10. The radiographic image detection system according to claim 6, wherein an image data storage region that stores the image data generated by the radiographic image detection device is provided at the attachable unit.

11. The radiographic image detection system according to claim 6, wherein the attachable unit is attachable to the external device, and an imaging condition storage region that stores information representing an imaging condition, which is inputted from the external device, is provided at the attachable unit.

12. The radiographic image detection system according to claim 6, wherein one of the attachable unit corresponds uniquely to one of the external device.

13. The radiographic image detection system according to claim 6 wherein, when attached to the image data generation section, the attachable unit functions as a handle for carrying the radiographic image detection device.

14. The radiographic image detection system according to claim 6, wherein, when communicating with the external device indicated by the identification information, the identification information includes a secret key for encrypting data to be transmitted with shared key cryptography or a public key for encrypting data to be transmitted with public key cryptography.

* * * * *